United States Patent [19]

Nishimoto

[11] 3,731,153

[45] May 1, 1973

[54] PROTECTIVE DEVICE FOR LOUDSPEAKER

[75] Inventor: Akira Nishimoto, Tokyo, Japan

[73] Assignee: Sansui Electric Co., Ltd., Tokyo, Japan

[22] Filed: Aug. 25, 1971

[21] Appl. No.: 174,875

[30] Foreign Application Priority Data

| | | |
|---|---|---|
| Aug. 27, 1970 | Japan | 45/85091 |
| Aug. 27, 1970 | Japan | 45/85092 |
| Aug. 27, 1970 | Japan | 45/85093 |
| June 9, 1971 | Japan | 46/40184 |

[52] U.S. Cl. ..............317/33 R, 307/202, 330/207 P, 317/33 SC

[51] Int. Cl. ..........317 36 TD, H02h 3/08, H02h 7/00

[58] Field of Search ........................317/33 R, 33 SC, 317/16, 148.5, 141 S, DIG. 5; 307/202, 128, 131, 94; 330/207 P

[56] References Cited

UNITED STATES PATENTS

| | | | |
|---|---|---|---|
| 3,551,745 | 12/1970 | Nicholas | 317/33 SC |
| 3,544,720 | 12/1970 | Corderman | 307/94 |
| 3,611,076 | 10/1971 | Darrow | 317/33 SC |
| 3,171,112 | 2/1965 | Martin | 307/202 |

*Primary Examiner*—D. F. Duggan
*Assistant Examiner*—Harvey Fendelman
*Attorney*—R. D. Flynn et al.

[57] ABSTRACT

In an audio amplifier comprising first and second transistors with their emitter-collector circuits connected in series to provide an output terminal, first and second sources respectively connected in series with the first and second transistors and a loudspeaker connected directly to the output terminal, there is provided a protective device for the loudspeaker comprising a circuit interrupting element connected between the output terminal and the loudspeaker and a control circuit responsive to a DC voltage exceeding a predetermined level which appears at the output terminal for operating the circuit interrupting element.

5 Claims, 7 Drawing Figures

PROTECTIVE DEVICE FOR LOUDSPEAKER

BACKGROUND OF THE INVENTION

This invention relates to a loudspeaker protective device of an audio amplifier and more particularly to a device for protecting a loudspeaker which is connected directly to the output terminal of an amplifier without utilizing a coupling capacitor against damages caused by a high DC voltage appearing at the output terminal.

A recent trend in the art is to use an audio amplifier wherein a loudspeaker is connected directly, or without using a coupling capacitor, to an output terminal between serially connected emitter-collector circuits of two output transistors for the purpose of improving the low frequency characteristic. A plurality of such amplifiers are used for multi-channel circuits. When such an amplifier becomes out of order, a relatively high DC voltage of the positive or negative polarity often appears at the output terminal of the amplifier, and such excessively high DC voltage not only damages the loudspeaker but also degrades the sound quality. It is therefore highly desirable to detect such an abnormal condition and to disconnect the loudspeaker from the circuit. Especially, in amplifiers for use in multi-channel circuits, it is desirable to provide a relatively simple protective device or circuit which can protect all loudspeakers of respective amplifiers. However, it has not yet been proposed such a protective device, especially suitable for use in multi-channel circuits.

SUMMARY OF THE INVENTION

Accordingly, it is the principal object of this invention to provide a novel protective device responsive to an abnormal DC voltage appearing at the output terminal of an amplifier for disconnecting a loudspeaker from the amplifier.

Another object of this invention is to provide such a protective device which can be used in common for a plurality of amplifiers.

In accordance with this invention, for use in an audio amplifier comprising first and second transistors with their emitter-collector circuits connected in series to provide an output terminal, first and second sources respectively connected in series with the first and second transistors, and a loudspeaker connected directly to the output terminal, there is provided a protective device for the loudspeaker comprising a circuit interrupting element connected in series with a first closed circuit including the first transistor, the first source and the loudspeaker and with a second closed circuit including the second transistor, the second source and the loudspeaker, and a control circuit which operates when a positive direct current voltage appearing at the output terminal reaches a predetermined level for interrupting the circuit interrupting element.

The circuit interrupting element may take the form of a fusible element or a relay contact thus reducing the cost of the protective device. Where the invention is applied to multichannel amplifiers, the relay contacts inserted in the respective loudspeaker circuits may be operated by a single common relay.

Where a fusible element is used it is interrupted by passing a short circuit current therethrough by operating a short circuiting circuit in response to an abnormal DC voltage appearing at the output terminal of the amplifier. On the other hand where a relay contact is used as the circuit interrupting element a rectifier is provided for converting the abnormal DC voltage appearing at the output terminal into a unidirectional output irrespective of the polarity of the abnormal voltage and a relay responsive to the unidirectional voltage is also provided for operating the relay contact.

The novel protective device can also be used to protect a plurality of loudspeakers associated with multichannel amplifiers with the same control circuit but by adding only a small number of circuit elements.

DESCRIPTION OF THE PREFERRED EMBODIMENTS

Figure 1:
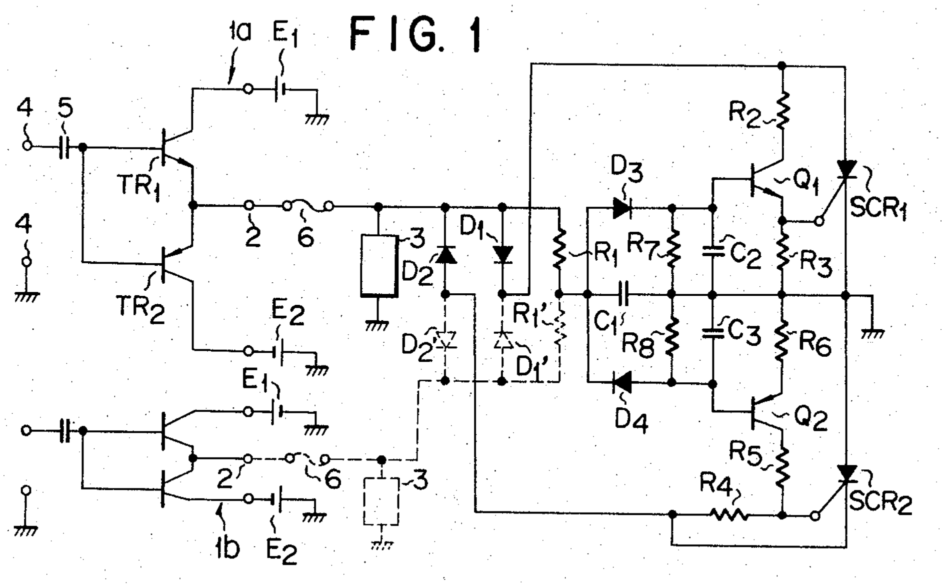
FIGS. 1 and 2 are connection diagrams of similar embodiments of this invention comprising a fuse connected in series with a loudspeaker circuit and a unidirectional short circuiting circuit.

The audio amplifier 1a shown in FIG. 1 comprises a first NPN-type output transistor $TR_1$ a second PNP-type output transistor $TR_2$, with their collector-emitter circuits connected in series, a first source of supply $E_1$ with its positive pole connected to the collector electrode of the first transistor and the regative pole grounded, a second source of supply $E_2$ with its negative pole connected to the collector electrode of the second transistor and the positive pole grounded, an output terminal 2 connected to the juncture between the emitter electrodes of the first and second transistors, and a loudspeaker 3 connected directly between the output terminal 2 and the ground without utilizing a coupling capacitor as has been the common practice. One of the audio signal input terminals 4 is connected to the base electrodes of both output transistors via a coupling capacitor 5 whereas the output terminal is grounded. It is to be understood that the invention is not limited to the particular amplifier illustrated.

According to this invention fusible element 6 is connected between the output terminal 2 and the loudspeaker 3. Thus, there are provided two closed circuits, one including source $E_1$, the first transistor $TR_1$, fuse 6 and loudspeaker 3, the other including source $E_2$, the second transistor $TR_2$, fuse 6 and loudspeaker 3. One terminal of the loudspeaker 3 connected to output terminal 2 is grounded through a series circuit including a resistor $R_1$ and a capacitor $C_1$ which is connected in parallel with other series circuits, one including a diode $D_1$ and a silicon controlled rectifier $SCR_1$ and the other a diode $D_2$ and a silicon controlled rectifier $SCR_2$ which are poled as shown in the drawing. In parallel with silicon controlled rectifier $SCR_1$ is connected a series circuit including an NPN-type transistor $Q_1$ a resistor $R_2$ connected to the collector electrode of transistor $Q_1$ and a resistor $R_3$ connected to the emitter electrode of the transistor so as to impress the voltage drop across resistor $R_3$ between the gate and cathode electrodes of the silicon controlled rectifier $SCR_1$. In the same manner, in parallel with silicon controlled rectifier $SCR_2$ is connected a second series circuit including a PNP transistor $Q_2$, resistors $R_4$ and $R_5$ connected in series with the collector electrode of transistor $Q_2$ and a resistor $R_6$ connected to the emitter electrode of this transistor so as to apply the voltage drop across resistor $R_4$ between the gate and cathode electrodes of the silicon controlled rectifier $SCR_2$. A capacitor $C_2$ and a resistor $R_7$ are connected between the base electrode of transistor $Q_1$ and the ground and a capacitor $C_3$ and a resistor $R_8$ are connected in parallel between the base electrode of transistor $Q_2$ and the ground. Diodes $D_3$ and $D_4$ poled as shown are connected respectively between the base electrodes of transistors $Q_1$ and $Q_2$ and the juncture between resistor $R_1$ and capacitor $C_1$.

Assuming now that an abnormal DC voltage of positive polarity appears at the output terminal 2 owing to some reason, the DC voltage will be impressed upon the base electrode of transistor $Q_1$ via resistor $R_1$ and diode $D_3$. When this abnormal voltage exceeds a predetermined value transistor $Q_1$ becomes conductive whereby the voltage drop across resistor $R_3$ caused by a current flowing through diode $D_1$, resistor $R_2$ and transistor $Q_1$ is impressed upon the gate electrode of silicon controlled rectifier $SCR_1$ thus, rendering the same conductive. This increases the current flowing from source $E_1$ through transistor $TR_1$, fuse 6, diode $D_1$, silicon controlled rectifier $SCR_1$, to the ground, thus melting fuse 6 to interrupt the output circuit to the loudspeaker.

On the other hand, upon appearance of an abnormal voltage of negative polarity at the output terminal 2, this negative DC voltage is impressed upon the base electrode of transistor $Q_2$ through resistor $R_1$ and diode $D_4$, thus turning ON transistor $Q_2$. When this negative voltage exceeds a predermined value, the voltage drop across resistor $R_4$ caused by the current flowing through diode $D_2$ and transistor $Q_2$ is impressed upon the gate electrode of silicon controlled rectifier $SCR_2$, thus turning ON the same. Consequently, fuse 6 is melted by the current flowing from source $E_2$ through the ground, silicon controlled rectifier $SCR_2$, diode $D_2$, fuse 6 and transistor $TR_2$.

In this manner, a unidirectional short circuiting circuit is always established irrespective of the polarity of the abnormal DC voltage appearing at output terminal 2, thus interrupting fuse 6 to provide positive protection for loudspeaker 3.

The above described protective device for the loudspeaker is advantageous in that it can not only protect the loudspeaker associated with a single amplifier, but it can also protect loudspeakers associated with a plurality of amplifiers by a simple modification. More particularly, where there is another loudspeaker 3 connected to another amplifier 1b having the same construction as amplifier **1*a*, by way of a fuse 6, the upper terminal of said another loudspeaker 3 is connected to the anode electrode of diode $D_2$ through a diode $D_2'$ and to the cathode electrode of diode $D_1$ through a diode $D_1'$ of the opposite polarity as shown by dotted lines. The upper terminal of said another loudspeaker 3 is also connected to the juncture between resistor $R_1$ and capacitor $C_1$ via resistor $R_1'$. This simple modification protects loudspeaker 3 associated with amplifier 1b** in the same manner as above described.

Figure 2:
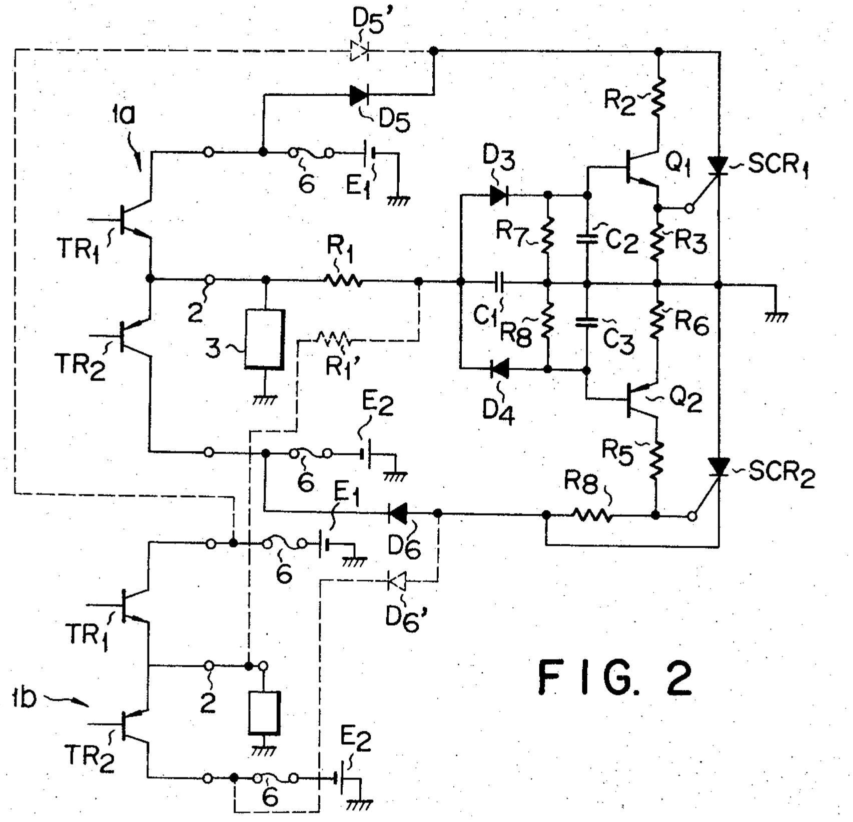

In the modification shown in FIG. 2, a first fuse 6 is connected between the collector electrode of transistor $TR_1$ and source $E_1$. Another fuse 6 is connected between the collector electrode of transistor $TR_2$ and source $E_2$. The collector electrode of the first transistor is connected to the anode electrode of silicon controlled rectifier $SCR_1$ through a diode $D_5$ having a polarity as shown in the drawing. Likewise the collector electrode of the second transistor $TR_2$ is connected to the cathode electrode of silicon controlled rectifier $SCR_2$ through diode $D_6$. The connection of other elements is identical to that shown in FIG. 1.

Upon occurrence of a DC voltage of positive polarity at output terminal 2, a unidirectional short circuiting circuit is established between source $E_1$ and the ground via one of the fuses 6, diode 5 and silicon controlled rectifier $SCR_1$. On the other hand, where a DC voltage of the negative polarity appears at the output terminal a second unidirectional short circuiting circuit is established between source $E_2$ and the ground via the other fuse, silicon controlled rectifier $SCR_2$, diode $D_6$ and the other fuse 6.

Where there is another amplifier **1*b*, the collector electrode of transistor $TR_1$ of this amplifier is connected to the anode electrode of silicon controlled rectifier $SCR_1$ via a diode $D_5'$ while the collector electrode of transistor TR of the second amplifier 1*b* is connected to the cathode electrode of silicon controlled rectifier $SCR_2$ via diode $D_6'$. Furthermore, the output terminal of the second amplifier 1b** is connected to the juncture between resistor $R_1$ and capacitor $C_1$ via a resistor $R_1'$, as shown by dotted lines.

Figures 3, 4:
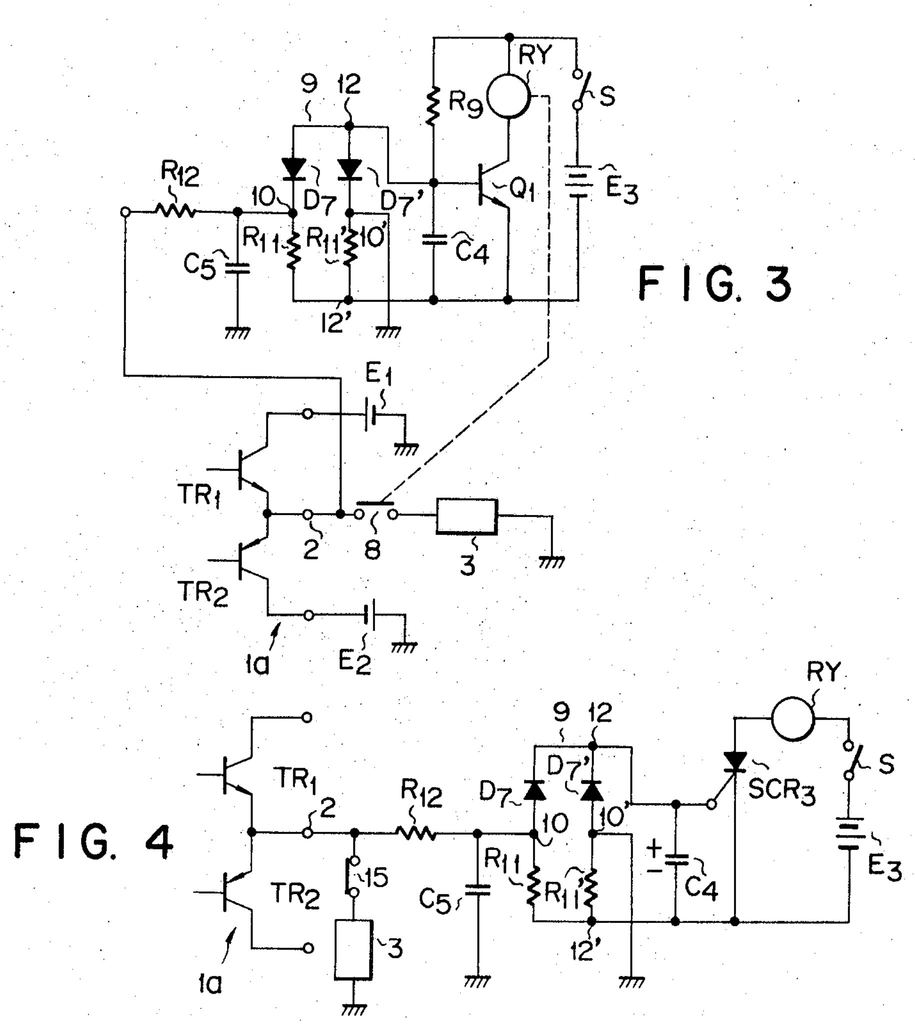
FIGS. 3 and 4 are connection diagrams of modified embodiments of this invention comprising a relay contact connected in series with a loudspeaker circuit, a rectifier circuit and a relay circuit controlled by the output from the rectifier circuit.

In the modified embodiment shown in FIG. 3, a normally closed contact 8 of a relay RY is connected between output terminal 2 and loudspeaker 3. A series circuit-including an NPN type transistor $Q_1$ and relay RY connected to the collector electrode of transistor $Q_1$ is energized by a source $E_3$ through a switch S, the negative pole of source $E_3$ being connected to the emitter electrode of transistor $Q_1$. Although not shown in the drawing, switch S is interlocked with a source switch for amplifier 1a. A capacitor $C_4$ is connected across the base and emitter electrodes of transistor $Q_1$, and a resistor $R_9$ is connected between the base electrode of transistor $Q_1$ and the juncture between relay RY and switch S. A bridge rectifier circuit 9 is provided comprising a first branch including a diode $D_7$ and a series resistor $R_1$, and a second branch including a diode $D_7'$ and a series resistor $R_{11}'$. One input terminal 10 of the rectifier circuit 9 is connected to output terminal 2 via a resistor $R_{12}$ whereas the other output terminal 10' is grounded. One output terminal 12 is connected to the base electrode of transistor $Q_1$ while the other output terminal 12' to the emitter electrode of transistor $Q_1$. A capacitor $C_5$ for bypassing the audio signals is connected between input terminal 10 and the ground.

In operation, when the source switch, not shown, of amplifier 1a is closed, switch S is also closed to charge capacitor $C_4$. When the terminal voltage of capacitor $C_4$ reaches a predetermined value, transistor $Q_1$ becomes conductive to energize relay RY. Then contact 8 is closed to connect loudspeaker 3 to output terminal 2 of the amplifier. It is possible to prevent loudspeaker 3 from generating uncomfortable noise at the time of closing the source switch by the suitable selection of the time constant of a series circuit comprising resistor $R_9$ and capacitor capacitor $C_4$.

As contact 8 is maintained closed, a positive DC voltage, appearing at the output of the amplifier is impressed across the input terminals 10 and 10' of rectifier circuit to decrease the voltage across capacitor $C_4$ by the output voltage of the opposite polarity produced by the rectifier. When the voltage across capacitor $C_4$ is decreased to a predetermined level, transistor $Q_1$ is turned OFF thus deenergizing relay RY to open contact 8. In this manner, the loudspeaker 3 and output transistors $TR_1$ and $TR_2$ are protected from burning out.

When a negative DC voltage appears at output terminal 2, a voltage of the opposite polarity is impressed across the input terminals 10 and 10' of rectifier circuit 9. However, as the rectifier circuit produces unidirectional outputs, contact 8 is opened in the same manner as above described.

The above described protection for the output transistor and the loudspeaker continues as long as the abnormal voltage persists and upon disappearance of the abnormal voltage the contact 8 is reclosed after a predetermined time.

If diodes are substituted for resistors $R_{11}$ and $R_{11}'$ of the bridge rectifier circuit 9 more satisfactory results could be obtained. Furthermore, transistor $Q_1$ may be replaced by an unijunction transistor. To apply the modified embodiment shown in FIG. 3 for a stereo device, the output terminal of another amplifier, not shown, is connected to input terminal 10 of bridge rectifier 9 via a resistor (not shown) similar to resistor $R_{12}$.

The object of this invention can also be accomplished by connecting a normally closed contact 15 of relay RY between the output terminal 2 of amplifier 1a and loudspeaker 3, as shown in FIG. 4. In this modified embodiment, output terminal 2 is connected to one input terminal 10 of bridge rectifier circuit 9 via resistor $R_{12}$. A capacitor $C_5$ for bypassing the audio signal is also connected to input terminal 10. The output terminals 12 and 12' are connected across a capacitor $C_4$, and the other input terminal 10' of the bridge rectifier circuit 9 is grounded in the same manner as in FIG. 3. However, as the polarities of diodes $D_7$ and $D_7'$ are opposite to those of the diodes shown in FIG. 3 the capacitor $C_4$ will be charged with the opposite polarity. The anode electrode of silicon controlled rectifier $SCR_3$ is connected to the positive pole of source $E_3$ through relay RY and switch S interlocked with the source switch, not shown, of the amplifier 1a while the cathode electrode is connected to the negative pole of source $E_3$. The gate electrode and the cathode electrode of the silicon controlled rectifier $SCR_3$ is connected in parallel with capacitor $C_4$.

Under normal conditions, since the terminal voltage of capacitor $C_4$ is zero the relay RY will not be energized even if contact S were closed whereby contact 15 is held closed. When a positive or negative DC voltage appears at output terminal 2, capacitor $C_4$ will be charged with a polarity shown in FIG. 4. When the terminal voltage of capacitor $C_4$ reaches a predetermined value silicon controlled rectifier $SCR_3$ becomes conductive to energize relay RY thus opening contact 15.

With this embodiment too, it is also possible to protect a plurality of loudspeakers by providing another normally closed contact operated by relay RY and another resistor which is identical to resistor $R_{12}$ and connected to the output terminal of another amplifier.

The object of this invention can also be accomplished by connecting normally closed contacts, not shown, of relay RY respectively in series with the collector electrodes of transistors $TR_1$ and $TR_2$.

Figures 5, 6:
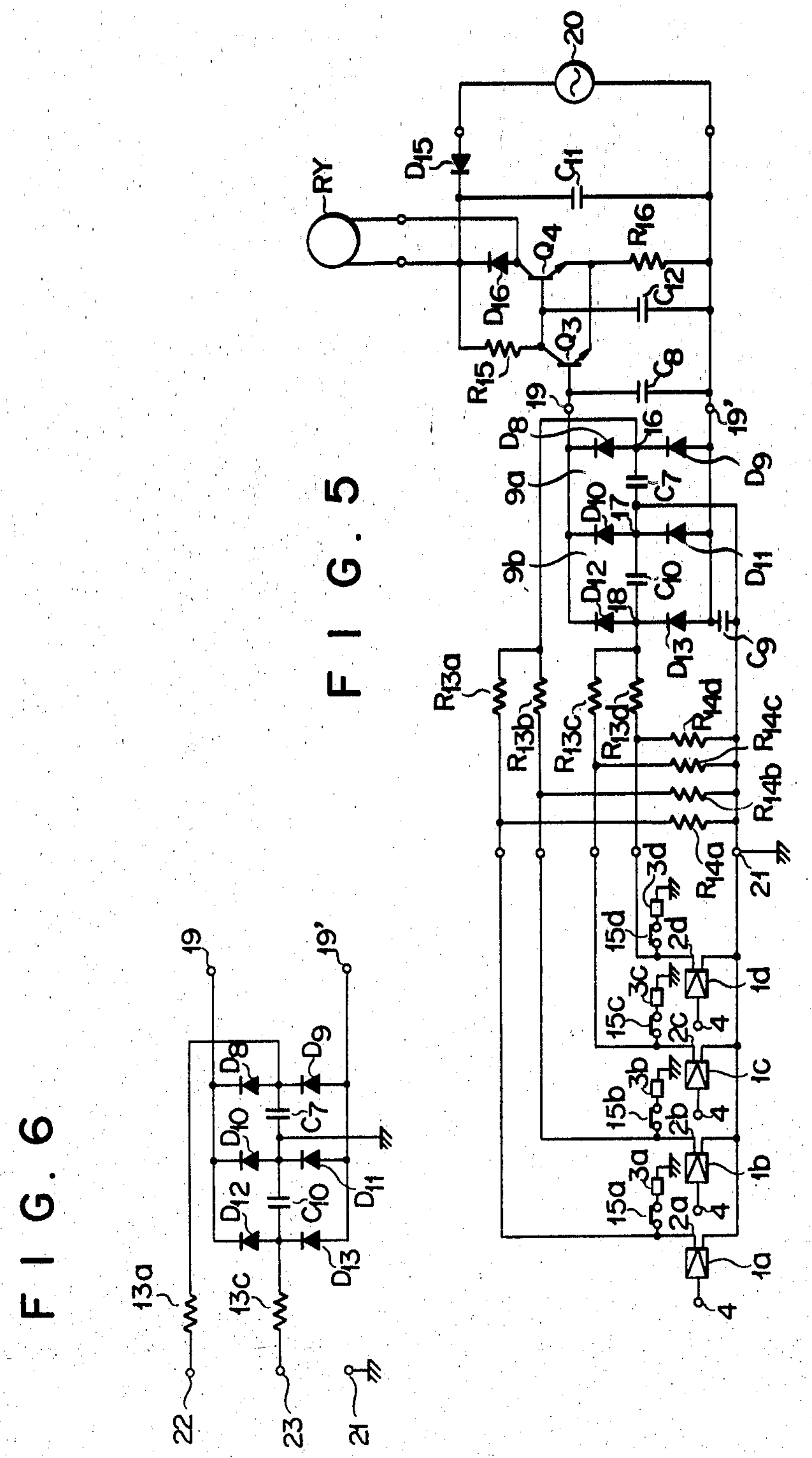
FIG. 5 shows a connection diagram of another embodiment of this invention applied to multi-channel amplifiers.

FIG. 5 shows a connection diagram of a modified embodiment of this invention as applied to a four channel stereo device. More particularly, two terminals of the opposite polarity of two sources (such as $E_1$ and $E_2$ shown in FIG. 1) of each one of four amplifiers *1a* through *1d* are grounded and the output terminals of these amplifiers are connected to one terminal of resistors $R_{13a}$ through $R_{13d}$, respectively. Each one of the amplifiers is provided with a signal input terminal 4. Output terminals *2a* to *2d* of respective amplifiers are connected to respective loudspeakers respectively through normally closed contacts *15a* to *15d* of a relay RY. Further, the output terminals are grounded through resistors $R_{14a}$ through $R_{14d}$ respectively. A pair of bridge rectifier circuits *9a* and *9b* are provided including diodes $D_8$ through $D_{11}$ and diodes $D_{10}$ through $D_{13}$, respectively. A capacitor $C_7$ is connected across the input terminals 16 and 17 of rectifier circuit *9a*. Input terminal 16 is connected to the opposite terminals of resistors $R_{13a}$ and $R_{13b}$ whereas the input terminal 17 is grounded. One input terminal 18 of rectifier circuit 9b is connected to the other terminals of resistors $R_{13c}$ and $R_{13d}$ and a capacitor $C_{10}$ is connected between two input terminals 17 and 18 of the rectifier circuit *9b*. A positive output terminal 19 and a negative output terminal 19' which are common to both rectifier circuits are connected across capacitor $C_8$. Furthermore, output terminal 19' is grounded through a capacitor $C_9$. Resistors $R_{13a}$ and $R_{13b}$ and capacitor $C_7$ cooperate each other to act as a low frequency blocking filter for the outputs from amplifiers *1a* and *1b* so that when a DC voltage of one polarity or an undesirable low frequency signal appears on the output terminals of these amplifiers. An input signal is applied across input terminals 16 and 17 of the rectifier circuit *9a*. Likewise resistors $R_{13c}$ and $R_{13d}$ and capacitor $C_{10}$ constitute a low frequency blocking filter for the outputs from amplifiers 1c and 1d so as to apply an input signal across input terminals 17 and 18 of the rectifier circuit 9b upon occurrence of a DC voltage of one polarity or an undesirable low frequency signal at the output terminals of these amplifiers.

Relay RY is energized from an AC source 20 via a rectifier including a diode $D_{15}$ and a smoothing capacitor $C_{11}$. The collector electrode of an NPN type transistor $Q_3$ is connected to the cathode electrode of diode $D_{15}$ through a resistor $R_{15}$ while the emitter electrode of the transistor is connected to the negative output terminal 19' of rectifier circuits *9a* and *9b* via a resistor $R_{16}$. The base electrode of transistor $Q_3$ is connected to the positive terminal 19 of the rectifier circuits. The base electrode is also connected to the negative terminal 19' through a biasing capacitor $C_8$. The collector electrode of another NPN type transistor $Q_4$ is connected to the cathode electrode of diode $D_{15}$ through a diode $D_{16}$ while the emitter electrode of transistor $Q_4$ is connected to the emitter electrode of transistor $Q_3$. The base electrode of transistor $Q_4$ is connected to the collector electrode of transistor $Q_3$ and to the negative output terminal 19' via a biasing capacitor $C_{12}$. Transistors $Q_3$ and $Q_4$ constitute a Schmidt circuit. The relay RY is connected across the anode and cathode electrodes of diode $D_{16}$.

Since transistor $Q_4$ is maintained normally in the conductive state by the bias voltage provided by capacitor $C_{12}$, relay RY is energized to maintain its contacts 15*a* through 15*d* in the closed condition. When a positive DC voltage appears at the output terminal of one of the amplifiers 1*a* through 1*d*, for example 1*a*, a current flows through a circuit that can be traced from output terminal 2*a* to the ground through resistor $R_{13a}$, diode $D_8$, transistor $Q_3$, resistor $R_{16}$, diode $D_{11}$ and grounded output terminal 21. On the contrary, where a negative DC voltage appears, a current flows from grounded terminal 21 through diode $D_{10}$, transistor $Q_3$, resistor $R_{16}$, diode $D_9$ and resistor $R_{13a}$ to the output terminal 2a. When the voltage across capacitor $C_8$ reaches a predetermined value transistor $Q_3$ becomes conductive to turn OFF transistor $Q_4$. Accordingly, relay RY is deenergized to open contacts 15*a* through 15*d*.

FIG. 6 shows a connection diagram of a protective device for loudspeakers of a two channel stereo device having two amplifiers corresponding to amplifiers 1*a* and 1*c* of the circuit shown in FIG. 5. The elements corresponding to those shown in FIG. 5 are represented by the same reference characters. Terminals 22 and 23 represent the output terminals of the amplifiers and across terminals 19 and 19' is connected the relay control circuit shown.

Figure 7:
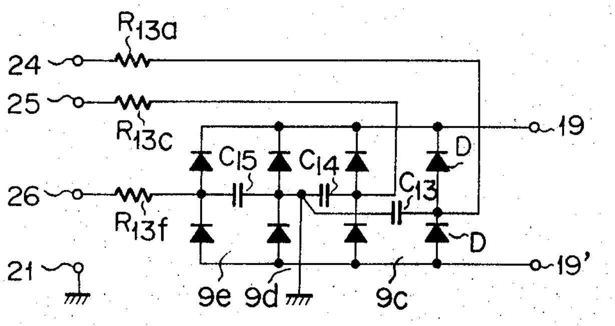
FIGS. 6 and 7 are connection diagrams of still further embodiments of the invention similar to that shown in FIG. 5 and adapted to protect loudspeakers associated with two channel amplifiers and three channel amplifiers respectively.

The circuit shown in FIG. 7 shows a protective circuit for loudspeakers of a three channel stereo device including three amplifiers shown in FIG. 5, for example amplifiers 1*a*, 1*b* and 1*c*. Terminals 24, 25 and 26 are connected to the output terminals of these amplifiers, respectively, and across output terminals 19 and 19' is connected the relay control circuit shown in FIG. 5 including relay RY. Since output terminals of respective amplifiers are connected to independent low frequency blocking filters, respectively including resistor $R_{13a}$ and capacitor $C_{13}$ resistor $R_{13c}$ and capacitor $C_{14}$ and resistor $R_{13f}$ and capacitor $C_{15}$, there are provided three bridge rectifier circuits 9*c*, 9*d* and 9*e* including eight diodes, some of them being used in common for two rectifying circuits. Like FIG. 5, a relay control circuit including a relay is connected across terminals 19 and 19'. The operation of the circuit shown in FIG. 7 is similar to that of the circuit shown in FIG. 5.

What is claimed is:

1. In an audio amplifier comprising first and second transistors with their emitter-collector circuits connected in series to provide an output terminal, first and second sources respectively connected in series with said first and second transistors, and a loudspeaker connected directly to said output terminal, a protective device for said loudspeaker comprising:
   a relay contact connected in series with a first closed circuit including said first transistor, said first source and said loudspeaker; and in series with a second closed circuit including said second transistor, said second source and said loudspeaker; and
   a control circuit which comprises a bridge rectifier circuit having an input terminal connected to said output terminal; and a relay circuit connected to the output terminal of said bridge rectifier circuit; said bridge circuit converting a positive or negative direct current voltage appearing at said output terminal into a direct current voltage of a given polarity; and said relay circuit opening said relay contact when said rectified direct current voltage exceeds a predetermined level.

2. Apparatus according to claim 1 wherein said relay circuit comprises a switch interlocked with the power switch of said amplifier; a capacitor connected to be charged to a predetermined voltage in a predetermined time after said switch has been closed; means for closing said relay contact in opened position when the voltage across said capacitor reaches a predetermined value; and means for decreasing the voltage across said capacitor in accordance with the output of said bridge rectifier circuit for opening said relay contact in closed position.

3. Apparatus according to claim 1 wherein said first and second sources are of opposite polarity.

4. In an audio amplifier arrangement comprising a plurality of amplifiers, each of said amplifiers including first and second transistors with their emitter-collector circuits connected in series to provide an output terminal, first and second sources respectively connected in series with said first and second transistors, and a loudspeaker connected directly to said output terminal, a protective device for said loudspeakers comprising:
   a circuit interrupting element comprising a plurality of relay contacts respectively connected in series with a first closed circuit which includes said first transistor of each of said amplifiers, said first source and said loudspeaker; and in series with a second closed circuit of each of said amplifiers including said second transistor, said second source and said loudspeaker; and
   a control circuit coupled in common to the output terminals of each of said amplifiers, said control circuit comprising a plurality of bridge rectifier circuits, predetermined branches of said bridge rectifier circuits being coupled in common for two adjacent rectifier circuits, a plurality of low frequency blocking circuits for applying to the input terminals of said rectifier circuits a DC voltage and an output of less than a predetermined frequency which appears at the output terminals of said amplifiers, and a relay circuit which opens the relay contacts when the out-puts from said rectifier circuit exceeds a predetermined value.

5. Apparatus according to claim 4 wherein said first and second sources are of opposite polarity.

* * * * *